(12) United States Patent
Epstein

(10) Patent No.: US 6,865,675 B1
(45) Date of Patent: Mar. 8, 2005

(54) METHOD AND APPARATUS FOR USE OF A WATERMARK AND A UNIQUE TIME DEPENDENT REFERENCE FOR THE PURPOSE OF COPY PROTECTION

(75) Inventor: Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/276,437

(22) Filed: Mar. 25, 1999

Related U.S. Application Data

(60) Provisional application No. 60/092,726, filed on Jul. 14, 1998.

(51) Int. Cl.[7] .................................................. H04L 9/00
(52) U.S. Cl. .................... 713/176; 713/165; 713/166; 713/200; 380/201; 380/203; 380/241; 380/242; 382/100; 382/232; 705/51; 705/57
(58) Field of Search .................. 713/176, 158, 713/178, 165, 166, 200; 382/100, 232; 705/51, 57; 725/104; 380/201, 203, 241, 242

(56) References Cited

U.S. PATENT DOCUMENTS

| | | | | | |
|---|---|---|---|---|---|
| 5,404,402 | A | * | 4/1995 | Sprunk | 380/4 |
| 5,499,298 | A | * | 3/1996 | Narasimhalu et al. | 705/54 |
| 5,530,390 | A | * | 6/1996 | Russell | 327/164 |
| 5,548,645 | A | * | 8/1996 | Ananda | 380/4 |
| 6,209,092 | B1 | * | 3/2001 | Linnartz | 713/176 |
| 6,310,956 | B1 | * | 10/2001 | Morito et al. | 380/201 |
| 6,430,301 | B1 | * | 8/2002 | Petrovic | 382/100 |
| 6,490,355 | B1 | * | 12/2002 | Epstein | 380/203 |
| 6,737,957 | B1 | * | 5/2004 | Petrovic et al. | 340/5.86 |

FOREIGN PATENT DOCUMENTS

| | | | | |
|---|---|---|---|---|
| EP | 0944256 A1 | * | 9/1999 | H04N/5/913 |
| EP | 1003167 A2 | * | 5/2000 | G11B/20/00 |
| WO | 9833325 | | 7/1998 | H04N/7/50 |
| WO | WO0004727 | * | 1/2000 | H04N/7/24 |

OTHER PUBLICATIONS

Memon et al, A Buyer–Seller Watermarking Protocol, 1998, IEEE, pp. 291–296.*
Miller et al, Watermarking in the Real World: An Application to DVD, 1999, IEEE, pp. 1496–1502.*

(List continued on next page.)

Primary Examiner—Ayaz Sheikh
Assistant Examiner—Aravind Moorthy
(74) Attorney, Agent, or Firm—Edward W. Goodman

(57) ABSTRACT

A copyright protection system for protecting content wherein a time dependent ticket is calculated at a source device by combining a checkpoint with a ticket. The checkpoint is transmitted from a display device to the source device prior to the source device transmitting watermarked content to the display device. The checkpoint is also stored at the display device. Thereafter, the source device transmits, to the display device, watermarked content, the ticket, and the time dependent ticket. At the display device, the stored checkpoint is compared to a current count of a local clock that was utilized for producing the checkpoint. If the stored checkpoint is within a window of time of the local clock, then the stored checkpoint is combined with the ticket in the same way that the checkpoint is combined with the ticket at the source device. A result of the combination is compared to the time dependent ticket and if the result equals the time dependent ticket, then the watermark and ticket may be compared in the usual way to determine the copy protection status of the copy protected content.

20 Claims, 3 Drawing Sheets

OTHER PUBLICATIONS

Kalker, Ton, System Issues in Digital Image and Video Watermarking for Copy Protection, 1999, IEEE, pp. 562–567.*

Yoshida, Junko, Copy Protection Logjam May Be Finally Breaking, 2002, Electronic Engineering, pp. 16 and 82.*

Schneier, Bruce, Applied Crytography, 1996, John Wiley & Sons, Inc., Second Edition, p. 30.*

Linnartz et al, Philips Electronics Response to Call for Proposals Issued by the Data Hiding SubGroup Copy Protection Technical Working Group, Oct. 1997, Philips Research, pp. 1–32.*

Linnartz, The "ticket" comcept for copy control based on embedded signalling, Feb. 1998, Philips Research, pp. 1–16.*

* cited by examiner

METHOD AND APPARATUS FOR USE OF A WATERMARK AND A UNIQUE TIME DEPENDENT REFERENCE FOR THE PURPOSE OF COPY PROTECTION This application claims the benefit of Provisional application Ser. No. 60/092,726, filed Jul. 14, 1998.

FIELD OF THE INVENTION

This invention generally relates to a system for protecting copyrighted content. Specifically, the present invention pertains to utilizing a ticket, a watermark, and a unique time dependent reference to protect content.

BACKGROUND OF THE INVENTION

The ability to transmit digital information securely is increasingly important. Owners of content want to be able to provide the content to authorize users without having the content utilized by unauthorized users. However, one problem with digital content is that an exact copy can be made without any degradation in the quality of the copy. Therefore, the copying of digital content is very attractive to pirating operations or attackers.

There are several different levels of attackers. Each type of attacker has a different level of sophistication, motivation, and means (software and hardware) needed to defeat a copy protection method. There are four typical types of attackers, a casual attacker, a hacker, a small-scale pirate, and a commercial pirate.

A casual attacker is an ordinary consumer that is motivated to copy content for later use (time shifting) or for distribution to friends and relatives. The level sophistication of a casual attacker is low. The casual attacker will typically only use consumer equipment in an unmodified form. A more aggressive casual attack may be mounted if a relatively inexpensive modification to consumer equipment is available. This may take the form of a hardware device such as the equipment used to defeat the Macrovision system. Typically, a casual attacker will not open a product to access the internal connections.

A hacker is usually motivated to copy protected content just to see if it can be done. The content may then be distributed widely in avoidance or in spite of copy protection laws. An attacker of this type is often highly skilled and may go to great lengths to acquire content. The financial resources of such an attacker are limited but the time resources can be high. Once the content is acquired, the content may be distributed to friends and relatives. In addition, the Internet may also provide an anonymous method for distributing the illegally copied content.

Both small-scale and commercial pirates are interested in defeating copy-protected content in order to produce and sell illegal copies of the content. By avoiding payments to the rightful owner of the copy-protected content, the pirates may reap large profits. Typically, the pirate may take advantage of the difference in release windows in order access high value content and distribute it.

For instance, in the movie industry, release windows are utilized to maximize profit from content. The essence of these release windows is to first release the content to a premium service such as a pay-per-view service or a video on demand service. Thereafter, the content may be released on a lower price service such as a home-box-office service. At this time, the content may also be available to a consumer through a purchased storage medium such as a Digital Video Disc (DVD).

Pirates however, frustrate the use of these release windows by pirating the content that is available through the premium service and then releasing pirated versions of the content to the public. This may cause substantial financial losses to the rightful owners of the content. Accordingly, a successful copy protection scheme should at least frustrate a pirates attempt for a sufficient period of time till the legitimate owner of the content may reap their rightful profits.

As a class, pirates are assumed to have information not readily available to the consumer including a direct knowledge and understanding of the circuitry within a product. Additionally, the pirate is willing to open the cover of the device to gain access to internal connections. These connections can be easily accessible or may take some amount of specialized tooling to locate or tap. A pirate may have the ability to reverse engineer a product sufficiently to determine the location of clear digital signals. A pirate may also have detailed information about internal circuitry of consumer electronics devices that would allow for the tapping of clear digital signals before or after compression. The pirate typically has the understanding needed to use expensive custom hardware that is designed to break cryptographic keys. Finally, the pirate is assumed to have knowledge of the algorithms and protocols used within the copy protection system and some ability to attempt to defeat them. The systems used to defeat copy protection may include a PC, a group of PCs, or custom-built equipment assembled for the sole purpose of defeating copy protection.

Beyond some level of attacker, the expense of defeating the attacker exceeds a reasonable limit whereby the device must be priced beyond what consumer is willing to pay. Thus, a copy protection solution must be cost effective but secure against a large number of attackers.

A cost-effective method of copy protection is discussed in detail by Jean-Paul Linnartz et al., in Philips Electronics Response to Call for Proposals Issued by the Data Hiding Subgroup Copy Protection Technical Working Group, July. 1997 ("Linnartz"), which is incorporated herein by reference. Within a digital transmission, such as an MPEG transport stream, additional data may be embedded within the transport stream to set the copy protection status of content contained within the digital transmission. For instance, the desired copy protection status may be "copy-once", "no-more-copy", "copy-never", and "copy-freely". Content that has a status of copy-once may be played and copied. During copying, the copy-once content is altered such that the content is in the no-more-copy state. Copy-never content is content that may only be played and may not be copied. Copy-freely content may be played and copied without restriction.

The additional data may take the form of a digital watermark. The watermark may be embedded directly into the content so that removal of the watermark will degrade the quality of the content. The watermark may be utilized as part of the copy protection scheme. As an example, the copy-freely state may be designated by the lack of a watermark within the content.

In operation, a transmission, such as a digital transmission, is sent from a source device and received by a receiving device. A source device is a device that is writing content onto a data bus, initiating a broadcast transmission, initiating a terrestrial transmission, etc. A sink device is a device that reads content from the data bus, etc.

FIG. 1 shows a typical system for the transmission of content. In FIG. 1, the source device is a broadcast initiator 101 that utilizes a transmitting antenna 102 to transmit content. The sink device is a broadcast receiver, such as a set-top-box (STB) 104 that utilizes a receiving antenna 103 for receiving the transmitted content. The STB 104 is shown connected to a display device 105, a player 106, and a player/recorder 107, through a bus 108. The term bus is utilized herein to refer to any system for connecting one device to another device. The bus may be a hard wired system such as a coaxial wire, an IEEE 1553 bus, etc., or the bus may be a wireless system such as an infra-red (IR) or radio frequency (RF) broadcast system. Several of the devices shown in FIG. 1 may at one time act as a source device and at another time act as a sink device. The STB 104 may be a sink for the broadcast transmission and be a source for a transmission on the bus 108. The player/recorder 107 may be a source/sink of a transmission to/from, respectively, the bus 108.

In the copy protection scheme discussed by Linnartz, a watermark (W) is embedded within transmitted content. A ticket is transmitted along with the transmitted content. The embedded watermark and the ticket together are utilized to determine the copy protection status of the transmitted content. The watermark may be embedded into the content by at least two known methods. One method embeds the watermark (W) in the MPEG coding of the content. Another method embeds the watermark (W) in the pixel data of the content. The ticket (T) is mathematically related to the watermark (W) as discussed in more detail below.

Performing one or more one-way functions on the ticket (T) derives the watermark (W). By use of the term one-way function, what is meant is that it is computationally unfeasible to compute the inverse of the function. An example of a publicly known mathematical one-way function is a hashing function, such as secure hash algorithm one (SHA-1) or RACE Integrity Primitives Evaluation Message Digest (RIPEMD). Computing an inverse means finding which particular $x_0$ leads to a given $y_0$ with $y_0=F(x_0)$. The term unfeasible is intended to mean that the best method will take too long to be useful for a pirate. For instance, the time that is required for a pirate to compute the inverse of a hashing function is too long for the pirate to frustrate the intended release window for protected content. The most efficient method known to find such an $x_0$ may be to exhaustively search all possible bit combinations of $x_0$ and to compute and verify $F(x_0)$ for each attempt. In other cases, there may be a more efficient method than an exhaustive search to compute an inverse of a one-way function, yet these methods are still too time consuming to be feasible for the pirate.

The bit content of the ticket (T) is generated from a seed (U). The content owner provides the seed (U). From the seed (U), a physical mark (P) is created. The physical mark (P) may be embedded on a storage medium such as a Read-Only Memory (ROM) disk. Performing one or more one-way functions on the physical mark (P), produces the ticket (T). The number of functions performed on the physical mark (P) to create the ticket (T) depends on the copy protection intended for the content.

In accordance with the system, the ticket (T) changes state during every passage of a playback device (e.g., a source device) and a recording device (e.g., a sink device). As discussed above, the state modifications are mathematically irreversible and reduce the remaining copy and play rights of the content that are granted by the ticket (T). In this way, the ticket (T) indicates the number of sequential playback and recordings that may still be performed and acts as a cryptographic counter that can be decremented but not incremented.

It should be noted that the copy protection scheme only protects content on compliant systems. A compliant system is any system that obeys the copy protection rules described above and hereinafter. A non-compliant system may be able to play and copy material irrespective of the copy protection rules. However, a compliant system should refuse to play copies of content illegally made on a non-compliant system.

In accordance with the copy protection scheme, a physical mark (P) (e.g., data) is embedded on a storage medium and is not accessible by other user equipment. The physical mark (P) data is generated at the time of manufacturing of the storage medium as described above and is attached to the storage medium in a way in which it is difficult to remove the physical mark (P) data without destroying the storage medium. The application of a one-way mathematical function, such as a hashing function, to the physical mark (P) data four times results in a watermark. Much like watermarks embedded in paper, the watermark is embedded in the medium (e.g., containing video, audio, or data) in such a way that it is infeasible to remove the watermark without destroying the material. At the same time the watermark should be imperceptible when the medium is used in the usual manner, such as when content from the medium is displayed.

A watermark by itself may indicate whether or not content stored on the storage medium is copy-once or copy-never. For instance, the absence of a watermark may indicate that the content may be copied freely. The presence of the watermark without a ticket on a storage medium may indicate copy-never content.

When the content is transmitted over a bus or other transmission medium, the physical mark (P) data is hashed twice to generate a ticket. When a compliant player receives the content, the ticket is hashed twice and matched to the watermark. In the case where the twice-hashed ticket and the watermark match, the content is played. In this way, a party may not substitute a false ticket along with the content to frustrate the copy protection scheme. In the case were there is a watermark but no ticket in the content, a compliant system will refuse to record the content.

When a compliant recorder reads the content, the watermark is checked to see if the material is copy-freely, copy-once, or copy-never. When there is no watermark, the content is copy-freely and may be copied freely as discussed above. When the content contains a watermark but no ticket, the content is copy-never and a compliant recorder will refuse to copy the content. However, a compliant player will play the content as long as the ticket hashed two times matches the watermark. When the content is copy-once, the content contains both a watermark and a ticket, a compliant recorder will hash the ticket twice and compare the twice-hashed ticket to the watermark. In the case where the watermark matches the twice-hashed ticket, the content may be recorded along with a once-hashed ticket and the watermark, thereby creating copy-no-more content (e.g., content with a once-hashed ticket and a watermark). The physical mark will be different on a writable disc and thus, even if an illegal copy is made of copy-never content via a non-compliant recording device, a compliant player will refuse to play the content recorded on the writable disc.

It should be noted that in a broadcast system, such as a pay-per-view system, a copy-never state may be indicated by the presence of a once-hashed ticket and a watermark. Both copy-no-more stored content and copy-never broadcast content are treated by a compliant system similarly. The content containing the once-hashed ticket may be played but may not be recorded in a compliant system. In the event that a party tries to record the content with the once-hashed ticket, a compliant recorder will first twice-hash the once-hashed ticket and compare the result (e.g., a thrice-hashed ticket) with the watermark. Since the thrice-hashed ticket will not match the watermark, the compliant recorder will refuse to record the content.

A compliant player that receives the once-hashed ticket will hash the once-hashed ticket and compare the result (e.g., a twice-hashed ticket) to the watermark. Since the twice-hashed ticket matches the watermark, the compliant player will play the content.

However, a problem exists wherein a non-compliant recorder receives content containing a ticket (a twice-hashed physical mark) and a watermark. In the event that a non-compliant recorder does not alter the ticket upon receipt or recording (e.g., the non-compliant recorder makes a bit-for-bit copy), the non-compliant recorder may make multiple copies of the ticket and the watermark that will play on a compliant player and that may be recorded on a compliant recorder. The same problem can exist where a non-compliant recorder receives content containing a once-hashed ticket (a thrice-hashed physical mark) and a watermark indicating copy-no-more content. In this case, the non-compliant recorder may make multiple copies of the once-hashed ticket and the watermark that will play on the compliant player.

In a case wherein the player receives the content directly from a read only medium, such as a Compact Disc ROM (CD-ROM), a physical mark can be embedded in the physical medium of the CD-ROM that is produced by an authorized manufacturer. The player may then check the physical mark to ensure that the content is being received from an authorized medium. In this way, if a pirate makes an unauthorized copy, the physical mark will not be present on the unauthorized copy and a compliant player will refuse to play the content. However, in the case of broadcast data for instance, wherein a player does not read content directly from the read-only medium, this method of copy protection is unavailable. Thus, for instance, a non-compliant player may deceive a compliant display device.

Accordingly, it is an object of the present invention to overcome the disadvantages of the prior art.

It is also an object of the present invention to provide a display device that is the final arbiter in deciding whether to display copy protected content. In this way, the display device is the gatekeeper that disallows recordings that are made and played back on non-compliant player/recorders.

It is a further object of the present invention to provide a method of transmitting copy protected copy-never content that will prevent a pirate from making copies that will display on a compliant display device.

It is still a further object of the present invention to create a ticket that is unique to a particular display device so that copy protected content will only play on the particular display device.

It is yet a further object of this invention to create a ticket that is inspected by the display device to decide whether the content is being transmitted in real time.

It is still yet a further object of this invention to create a time dependent ticket that is checked by a display device to determine if content has expired or aged beyond an allowable window of time from a checkpoint.

It is still yet a further object of this invention to use a relative time reference configured such that each display device has a different relative time reference.

SUMMARY OF THE INVENTION

These and other objects of the present invention are achieved by a copy protection system for protecting content, such as content containing a watermark embedded therein (e.g., watermarked content). In accordance with the present invention, a relative time dependent ticket is created at a source device preferably utilizing a display device dependent time reference (a checkpoint). In accordance with one embodiment of the present invention, the checkpoint is combined with a ticket utilizing a concatenation function and a one-way function (e.g., a hashing function). The checkpoint is transmitted from the display device to the source device prior to the source device transmitting watermarked content to the display device. The checkpoint is also stored at the display device. Thereafter, the source device transmits to the display device watermarked content, the ticket, and the relative time dependent ticket.

At the display device, the stored checkpoint is compared to a current relative time reference. If the difference between the stored checkpoint and the current relative time reference is acceptable, then further steps, as discussed below, may proceed. What is an acceptable difference between the stored checkpoint and the current relative time reference will depend on the nature of the desired content protection. For example, in one embodiment or for one particular type of content, the difference may be short to ensure that the content is being transmitted and received in real time. In another embodiment or for another type of content, the difference may be longer to allow for storage of the content for later playback.

When the difference between the stored checkpoint and the current relative time reference is acceptable, the ticket is next hashed twice and compared to the watermark in the usual way. In the event that the ticket compares to the watermark (W=H(H(T))), the stored checkpoint is combined with the ticket in the same way that the checkpoint was combined with the ticket at the source device. A result of the combination is compared to the relative time dependent ticket. If the result equals the relative time dependent ticket, then the display device is provided with access (e.g., enabled to display) to the watermarked content.

Preferably, the checkpoint is derived from a counter that purposely is inaccurate such that the count can be said to be unique as compared to a the count from other display devices. The counter is constructed with a sufficient number of bits such that the counter will not roll over to zero in the lifetime of the display device. The counter is constructed to only count up, such that the count may not be reversed and thereby, allow expired content to be displayed.

In yet another embodiment, a certificate containing the public key of the source device is sent to the display device prior to the above described process. A public key known to the display device may be used to verify the certificate. Preferably, the public key used to verify the certificate is built into the display device by the manufacturer of the display device. In this embodiment, the relative time dependent ticket (the checkpoint concatenated with the ticket) may be encrypted utilizing a private key of the source device. The encrypted relative time dependent ticket is then transmitted from the source device to the display device along with the watermarked content and the ticket. Thereafter, prior to the display device verifying the checkpoint, the display device decrypts the relative time dependent ticket utilizing a public key of the source device. In still yet another embodiment, the relative time dependent ticket may be signed (as is know in the art, by hashing the relative time dependent ticket and encrypting that hashed result) utilizing a private key of the source device. The resulting signature is sent along with the watermarked content, the relative time dependent ticket, and ticket to the display device. Thereafter, prior to the display device verifying the checkpoint, the display device verifies the signature on the relative time dependent ticket utilizing a public key of the source device.

BRIEF DESCRIPTION OF THE DRAWINGS

The following are descriptions of embodiments of the present invention that when taken in conjunction with the following drawings will demonstrate the above noted features and advantages, as well as further ones. It should be expressly understood that the drawings are included for illustrative purposes and do not represent the scope of a present invention. The invention is best understood in conjunction with the accompanying drawings in which.

DETAILED DESCRIPTION OF THE INVENTION

Figure 1:
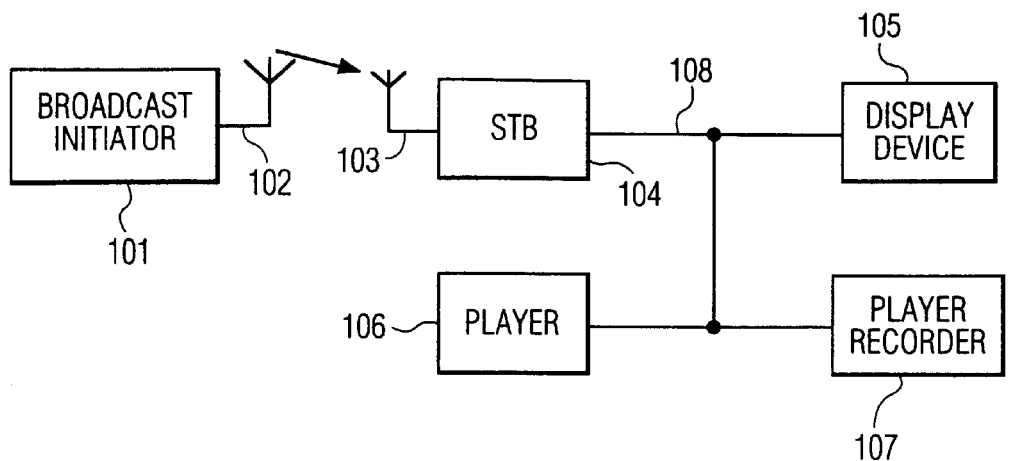
FIG. 1 shows a conventional system for the transmission of content.
Figure 2:
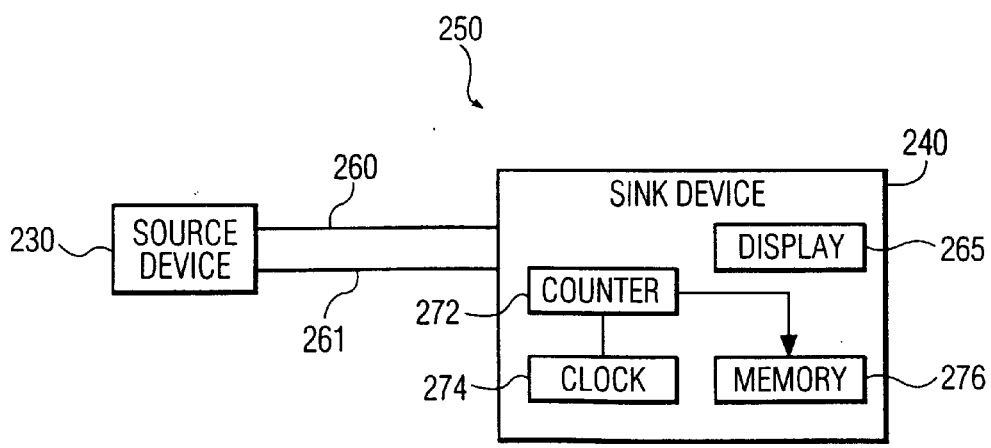
FIG. 2 shows an illustrative communication network in accordance with an embodiment of the present invention.

FIG. 2 depicts an illustrative communication network 250 in accordance with an embodiment of the present invention. A source device 230, such as Set Top Box (STB), a Digital Video Disc (DVD), a Digital Video Cassette Recorder, (DVCR), or another source of content, utilizes a transmission channel 260 to transmit content to a sink device 240. The transmission channel 260 may be a telephone network, a cable television network, a computer data network, a terrestrial broadcast system, a direct broadcast satellite network, some combination thereof, or some other suitable transmission system that is know in the art. As such, the transmission channel 260 may include RF transmitters, satellite transponders, optical fibers, coaxial cables, unshielded twisted pairs of wire, switches, in-line amplifiers, etc. The transmission channel 260 may also operate as a bi-directional transmission channel wherein signals may be transmitted from/to the source device 230, respectively, to/from the sink device 240. An additional transmission channel 261 may also be utilized between the source device 230 and the sink device 240. Typically, the transmission channel 260 is a wide-bandwidth channel that in addition to transmitting copy protection content (e.g., copy protection related messages), transmits copy protected content. The transmission channel 261 typically is a low-bandwidth channel that is utilized to transmit copy protection content.

The sink device 240 contains a memory 276 that is utilized for storing a checkpoint. The sink device 240 also contains a counter, such as a counter 272, that is utilized for generating the checkpoint. Preferably, the counter 272 should increment on a microsecond or better resolution as suitable for the application. The counter 272 should be free running. For instance, the counter 272 should count at all times that the sink device 240 is on. The bits of the counter 272 should employ non-volatile memory such as an electrically erasable programmable read-only memory (EEPROM) for the storage of the count. The counter 272 preferably is constructed to only count in one direction (e.g., up) and not in another direction (e.g., down). In a preferred embodiment, the counter 272 is driven by an inaccurate time source (e.g., inaccurate in terms of keeping time over hours, not necessarily over seconds), such as clock 274. The clock 274 is preferably unreliable so that drift with respect to time and temperature is also non-negligible. Over time, this has the effect of randomizing the count of a counter for each sink device of a population of sink devices. In addition, the, counter 272 may be driven fast for a random period of time to initialize the counter 272 to a random number at the time of manufacture. All of the above, has an effect of further randomizing the counter 272. The counter 272 is also configured such that it is inaccessible to a user. Accordingly, the user may not reset the counter 272.

The checkpoint, in accordance with the present invention, is transmitted to the source device 230 utilizing at least one of the transmission channels 260, 261. The source device 230 utilizes the checkpoint to change the ticket such that the watermarked content may only be utilized (e.g., played) by a corresponding sink device as described in more detail below. In the event that the corresponding sink device, such as the sink device 240, receives the watermarked content, then the content may be provided to a device, such as a display device 265, for display thereon. Preferably, the display device 265 is integral to the sink device 240 such that the display device 265 is the final arbiter in determining whether the copy protected content may be utilized. It should be obvious that although the device is illustratively shown as the display device 265, in fact the device may be any known device that may be suitably utilized for the copy protected content. For instance, in a case wherein the copy protected content is audio content, the device may be the device that outputs the audio signal.

In one embodiment of the present invention, the content may be provided from the source device 230 in the form of a Moving Picture Experts Group (MPEG) compliant transport stream, such as an MPEG-2 compliant transport stream. However, the present invention is not limited to the protection of an MPEP-2 compliant transport stream. As a person skilled in the art would readily appreciate, the present invention may be suitably employed with any other data stream that is known in the art for transmitting content.

In another embodiment, the source device 230 may be a conditional access (CA) device. In this embodiment, the transmission channel 260 is a conditional access module bus.

Figure 3:
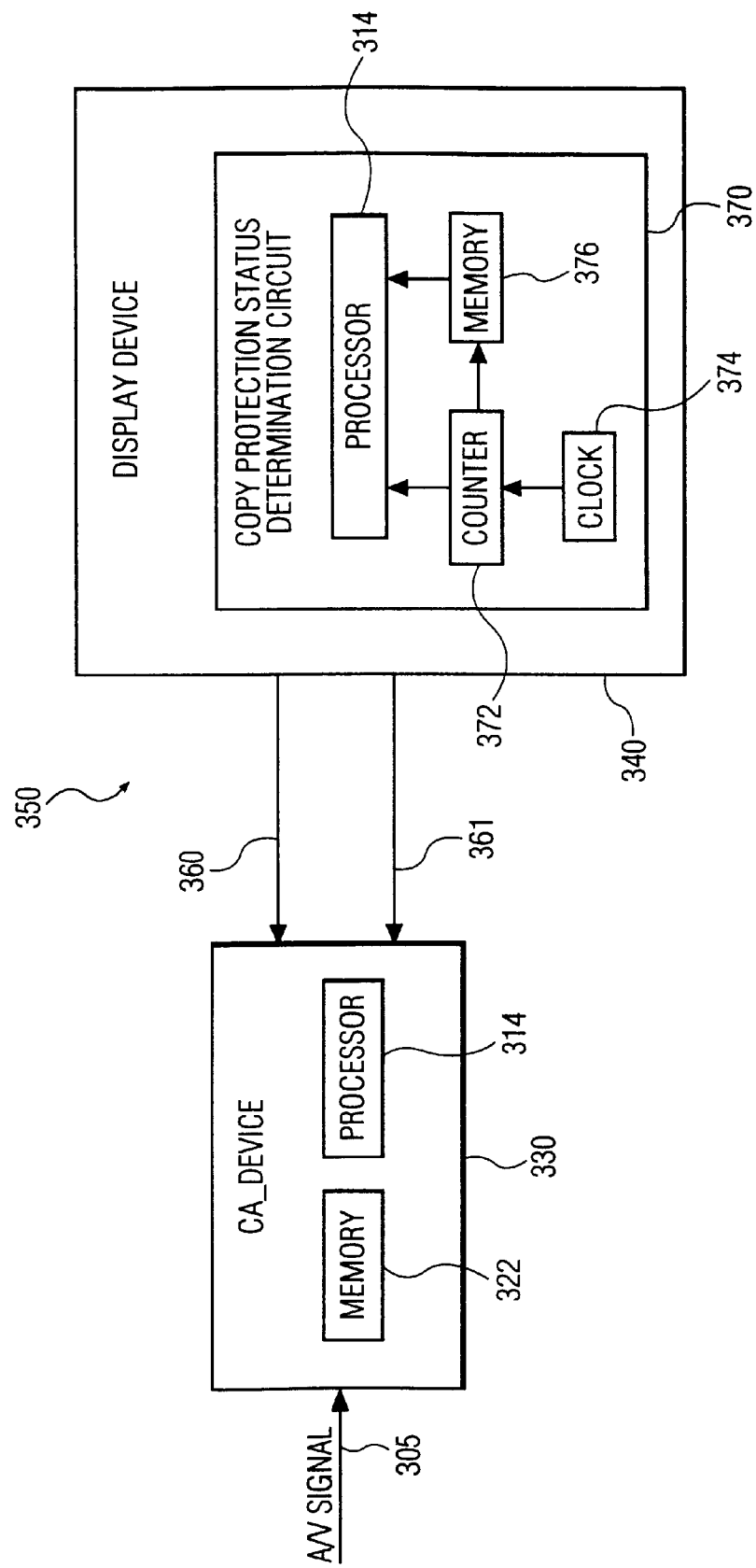
FIG. 3 shows details of an illustrative communication network in accordance with embodiment of the present invention wherein a source device provides content to a sink device.

FIG. 3 depicts details of an illustrative communication network 350 in accordance with an embodiment of the present invention. In the communication network 350, a source device 330 provides content including copy protected content to a sink device 340 over a transmission channel 360. As discussed above with regard to the transmission channel 260, the transmission channel 360 may be a wide bandwidth transmission channel that may also have a bi-directional capability, such as a CA module bus.

The sink device 340 contains a copy protection status determination circuit 370 for creating/storing a checkpoint (C) and for determining the copy protection status of received content. The copy protection status determination circuit 370 contains a counter 372 and a clock 374 for creating the checkpoint (C). The counter 372 preferably contains a large number of bits (e.g., 64 bits for a clock 374 that increments on a millisecond basis). Preferably, the counter 372 should have a total count cycle time (the time required for the counter 372 to reach a top count from a bottom count) longer than a useful life of the sink device 340 (e.g., ten years). The clock 374 is preferably randomized (e.g., unreliable such that drift with respect to time and temperature is non-negligible) as discussed above with regard to the clock 274 shown in FIG. 2. The counter 372 is configured such that it is inaccessible and has no reset function even in the event of a removal of power. As such, the counter 372 may contain non-volatile storage, such as programmable read-only memory (PROM), electrically erasable PROM (EEPROM), static random access memory (static-RAM), etc. Further, the copy protection status determination circuit 370 contains a memory device 376 for storing the checkpoint (C).

In operation., the source device 330 may request the checkpoint (C) from the sink device 340 prior to transmitting copy protected content. In alternate embodiments, the sink device 340 may transmit the checkpoint (C) to the source device 330 as a portion of a request for the source device 330 to begin transmission of copy protected content to the sink device 340. The sink device 340 may utilize either of the transmission channels 360, 361 for transmission of the request for copy protected content and/or for transmission of the checkpoint (C). However, in some embodiments of the present invention, the transmission channel 360 may be unidirectional and may only be utilized for the transmission of content to the sink device 340 from the source device 330. In these embodiments, the transmission channel 361 is utilized for the transmission of the checkpoint (C) from the sink device 340 to the source device 330. The transmission channel 361 may also be utilized for transmitting a request for copy protected content from the sink device 340 to the source device 330.

In an alternate embodiment, the transmission channel 360 has bi-directional capability and may be utilized for transmissions both to and from the source device 330, and to and from the sink device 340. In this embodiment, the transmission channel 361 may not be present or it may be utilized solely for the transmission of content requiring low bandwidth. For instance, the source device 330 may utilize the transmission channel 361 to transmit to the sink device 340 a request for the transmission of the checkpoint (C).

In one particular embodiment, the source device 330 is a conditional access (CA) device 330, the transmission channel 360 is a CA module bus 360, and the sink device 340 is a display device 340. Prior to the transmission of copy protected content, the CA device 330 transmits a request for a checkpoint (C) (e.g., the current count from the free running counter 372) from the display device 340. In response to the request, the display device 340 transmits the checkpoint (C) to the CA device 330 over the CA module bus 360. In addition to sending the checkpoint (C) to the CA device 330 the display device 340 saves the checkpoint (C) in the memory 376.

The CA device 330 contains a processor 314. The processor 314 utilizes a ticket and the checkpoint (C), received from the display device 340, to create a relative time dependent ticket (TDT) as discussed in more detail below. In one embodiment, the processor 314 may simply be a fixed hardware device that is configured for performing functions, such as mathematical functions, including a concatenation function, a one-way function, such as a hashing function, etc. In alternate embodiments, the processor 314 may be a microprocessor or a reconfigurable hardware device. What is intended by the term "relative time dependent ticket (TDT)" is that due to the randomization of the counter 372 as discussed above, the checkpoint (C) is not directly related to an absolute time amongst all sink devices. The checkpoint (C) is only related to a relative time of a given sink device such as the display device 340.

In one embodiment, the copy protected content is received via an input 305 as an audio/video (A/V) signal. Preferably, in this embodiment, the A/V signal contains a watermark (W) and a ticket (T). The watermark (W) and the ticket (T) are related as discussed with regard to the prior art (e.g., W=H(H(T))). Preferably, the watermark (W) is embedded into the copy protected content. In this way, removal of the watermark (W) from the copy protected content will result in the copy protected content becoming largely degraded. The ticket accompanies the content and is not embedded in it.

In an alternate embodiment, the copy protected content is read from a physical medium, such as a digital video disc (DVD). In this embodiment, the DVD may contain a physical mark (P) as described above. Further, content contained on the DVD (e.g., A/V content) has a watermark (W) embedded therein (e.g., watermarked content) such that removal of the watermark (W) from the A/V content results in the A/V content becoming largely degraded. In this embodiment, the physical mark (P), the ticket (T), and the watermark (W) are related as follows:

$$T=H(H(P)) \tag{1}$$

$$W=H(H(T)) \tag{2}$$

In any event, at the CA device 330, the checkpoint (C) is combined with the ticket (T), utilizing for instance concatenation and hashing functions. Thereby, a time dependent ticket (TDT) is created as follows:

$$TDT=H(T.C). \tag{3}$$

The watermarked content, containing a watermark (W) embedded therein, the time dependent ticket (TDT), and the ticket (T), are then transmitted via the CA module bus 360 to the display device 340.

At the receiver 340, the copy protection status determination circuit 370 extracts the watermark (W) from the watermarked content. The copy protection status determination circuit 370 compares the watermark (W) and the ticket (T) in the usual way, as is known in the art (e.g., W=H(H(T))?).

In the event that the comparison does not pass (e.g., W≠H(H(T))), then the content is discarded and any selected operation at the display device 340 (e.g., play, record, etc.) regarding the content is disabled. However, if the comparison does pass (e.g., W=H(H(T))), then the copy protection determination circuit 370 retrieves the stored checkpoint (C) from the memory 376 and combines the ticket (T) with the stored checkpoint (C), utilizing the same operation that was utilized at the source device 330 for creating the time dependent ticket (TDT). For instance, concatenation and hashing functions may be utilized at the display device 340 for combining the ticket (T) with the stored checkpoint (C). A result of the combination is then compared to the time dependent ticket (TDT):

$$TDT=H(T.C)? \tag{4}$$

In the event that the result does not equal the time dependent ticket (TDT), then the content is discarded and any selected operation at the display device (e.g., play, record, etc.) regarding the content is disabled. This may happen, for instance, in a case wherein an improper display device (e.g., a display device other than the display device that requested the content) has received the content. If the result does equal the time dependent ticket (TDT), then access to the content is enabled in accordance with the access granted by the ticket.

In a preferred embodiment, a further step is performed prior to the display device 340 having access to the copy protected content. Specifically, the checkpoint (C) stored in the memory 376 is compared to a current count of the (running) counter 372. In the event that the stored checkpoint (C) is within an allowable window of the current count from the counter 372 (e.g., within 24 hours of the count for some applications), then the display device 340 is provided with access to the copy protected content. What is an allowable window between the stored checkpoint (C) and the current count will depend on the nature of the desired content protection. For example, in one embodiment or for one particular type of content, the allowed window (the difference between the stored checkpoint (C) and the current count) may be short to ensure that the content is being transmitted and received in real time. In another embodiment or for another type of content, the allowed window may be longer (e.g., months or years) to allow for storage of the content for later playback.

If the checkpoint (C) has expired (e.g., not within the allowed window), then the checkpoint (C) is erased and the display device 340 is not provided with access to the copy protected content. As is readily ascertained by a person of ordinary skill in the art, the comparison of the checkpoint (C) to the current count may be performed any time prior to the display device having access to the copy protected content. In a preferred embodiment, the checkpoint (C) is compared to the current count prior to the comparison of the watermark (W) to the ticket (T).

It should be clear that a trusted source should be utilized to create the recorded content or the real time trasmitted content (e.g., received over the input 305). A CA device, such as the CA device 330, which is inherently designed to be tamper resistant is an example of a trusted real time source. In this case, it may be assumed that the CA device 330 decrypts the watermarked content so that prior to the watermarked contents arrival at the CA device 330, the watermarked content cannot be recorded.

In a case wherein the ticket (T) does not properly compare to the watermark (W), or some other portion of the copy protection status determination process fails, the copy protected content is discarded. In addition, when the copy protection status determination process fails, no operation regarding the copy protected content is enabled at the display device 340.

In accordance with the present invention, a checkpoint (C) from a counter of a given display device is in effect unique. Accordingly, the copy protected content transmitted by the CA device 330 may not be distributed to a display device other than the display device that sent the checkpoint (C). In addition, by comparing the checkpoint (C) to the count of the counter 372, the copy protected content may be restricted to being played within a time, as determined by the window of time as discussed above.

In yet another embodiment, a private/public key system, as is known by a person of ordinary skill in the art, is utilized to further secure the copy protected content in accordance with the present invention. In accordance with this embodiment, the display device 340 has a public key that is trusted e.g., secure for example by being installed in part of the display device hardware, such as stored in the memory 376. The public key corresponds to a private key of the manufacturer of the display device 340 and is stored, for instance, in a memory 322 at the CA device 330. The private key is utilized to sign certificates of each CA device manufacturer, as is known in the art.

In operation, when the CA device 330 is connected to the display device 340 via the CA module bus 360, a certificate containing the CA device 330 public key is sent to the display device 340. Once the certificate containing the public key of the CA device 330 is verified by the display device 340, as is known in the art, the public key of this CA device 330 is stored at the display device 340. Thereafter, the CA device 330 may digitally sign the time dependent ticket (TDT). For instance, the time dependent ticket (TDT) may be hashed and the result may be encrypted by the private key of the CA device 330 to form a signature. The signature is sent from the CA device 330 to the display device 340 together with the watermarked content, the ticket, and the time dependent ticket (TDT). At the display device 340, the signature is verified utilizing the public key of the CA device 330 and thereafter, the time dependent ticket (TDT) and checkpoint (C) are utilized as described above.

In yet another embodiment, the time dependent ticket (TDT) may be encrypted utilizing the private key of the CA device 330. The encrypted time dependent ticket (TDT) is then transmitted from the CA device 330 to the display device 340 along with the watermarked content and the ticket (T). Thereafter, prior to the display device 340 verifying the checkpoint (C), the display device 340 decrypts the time dependent ticket (TDT) utilizing the public key of the CA device 330. Thereafter, the time dependent ticket (TDT) may be utilized as discussed above.

Figure 4:
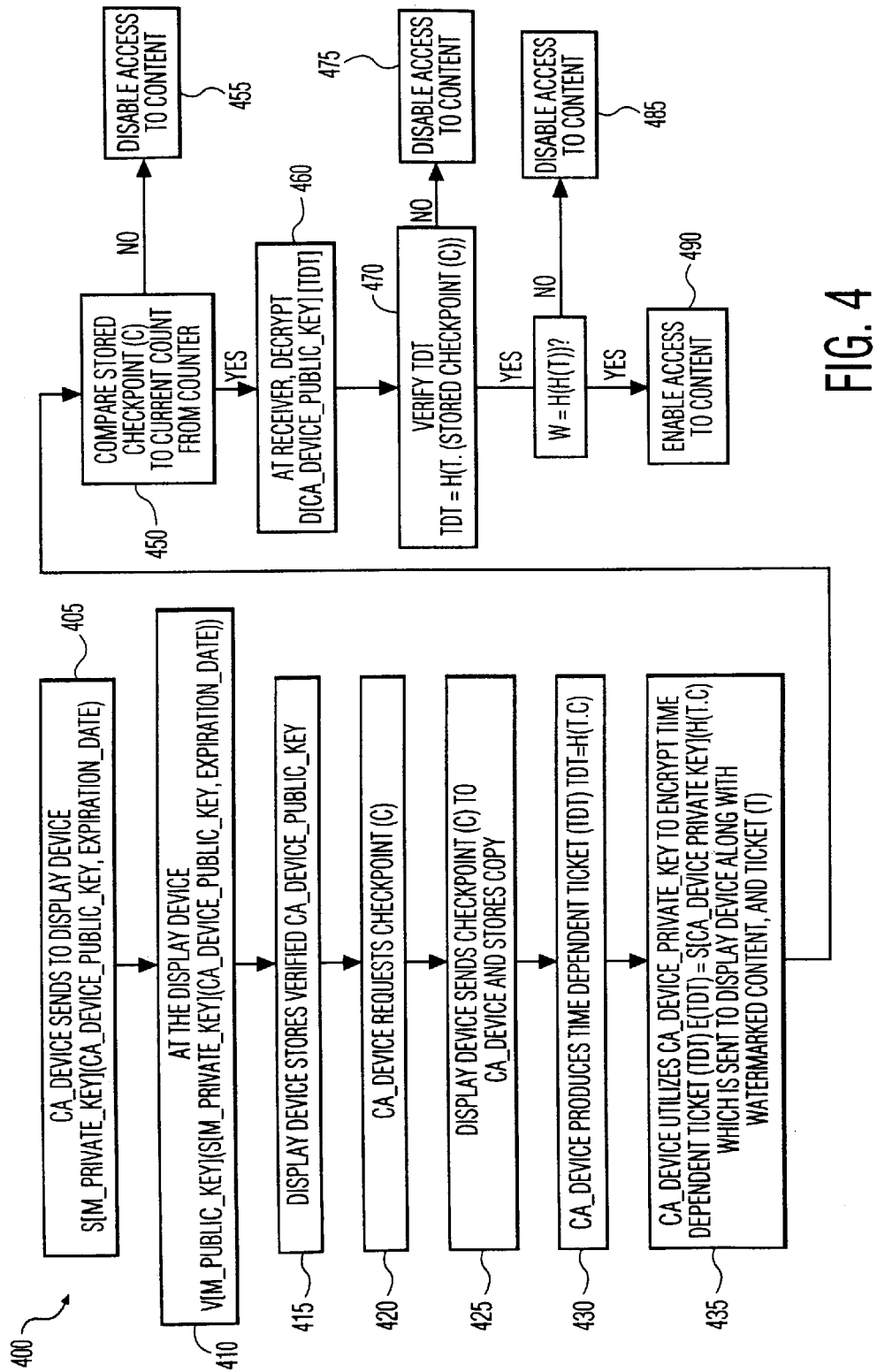
FIG. 4 shows a flow diagram in accordance with an embodiment of the present invention wherein a checkpoint is utilized as a relative time reference and a private/public key system is utilized to further secure the time dependent ticket.

FIG. 4 shows a flow diagram 400 of an illustrative protocol for use of a checkpoint and a private/public key system in accordance with an embodiment of the present invention. In step 405, in accordance with the present invention, after a CA device is connected to a display device, the CA device sends a certificate containing the CA device public key to the display device. In step 410, the display device verifies the certificate utilizing the embedded public key of the manufacturer and in step 415, stores the verified public key of the CA device. In step 420, in response to a request for copy protected content from the display device, the CA device requests a checkpoint (C) from the display device. In step 425, the display device sends the checkpoint (C) to the CA device and also stores a copy of the checkpoint (C) locally (e.g., at the display device). In step 430, the CA device combines the checkpoint (C) with the ticket (T) utilizing concatenation and hashing functions to produce a time dependent ticket (TDT). In step 435, the CA device encrypts the time dependent ticket (TDT) utilizing the CA device private key. The encrypted time dependent ticket (TDT) is then sent to the display device along with the watermarked content and the ticket (T). In step 450, the display device compares the stored checkpoint (C) with the current state of a counter to determine if the checkpoint (C) is within an allowable window of time of the current state of the counter. If the stored checkpoint (C) is not within the allowable window of time of the current state of the counter, then in step 455, access to the content is disabled. If the stored checkpoint (C) is within the allowable window, then in step 460, the display device utilizes the public key of the CA device to decrypt the time dependent ticket (TDT). In step 470, the display device combines the ticket (T) with the stored checkpoint (C) utilizing concatenation and hashing functions and compares a result to the time dependent ticket (TDT). If the result is not equal to the time dependent ticket (TDT), then in step 475 access to the content is disabled. If the result is equal to the time dependent ticket (TDT), then in step 480, the ticket and watermark are compared in the usual way. If step 480 fails (e.g., W≠H(H(T))), then in step 485, access to the content is disabled. If step 480 passes (e.g., W=H(H(T))), then in step 490, access to the content is enabled (e.g., the content may be displayed). Finally, the above-discussion is intended to be merely illustrative of the invention. Numerous alternative embodiments may be devised by those having ordinary skill in the art without departing from the spirit and scope of the following claims.

The claimed invention is:

1. A method of protecting content transmitted as a stream of data, the method comprising the steps of:
    determining a checkpoint at a receiving device;
    calculating, at a source device, a time dependent ticket utilizing the checkpoint, wherein a watermark, a ticket, and the checkpoint together indicate a copy protection status of the content;
    transmitting said stream of data, said watermark, said ticket, and said time dependent ticket to said receiving device; and
    comparing said time dependent ticket to a stored checkpoint at said receiving device.

2. The method of claim 1, wherein said step of calculating said time dependent ticket comprises the steps of:
    combining said checkpoint with said ticket; and
    calculating a one-way operation on said combined checkpoint and ticket.

3. The method of claim 2, further comprising the step of selecting said one-way function to be a hashing function.

4. The method of claim 1, further comprising the step of comparing, at said receiving device, said ticket and said watermark to determine the copy protection status of the content if said time dependent ticket compares to said stored checkpoint.

5. The method of claim 1, wherein said checkpoint is a checkpoint from a receiver counter.

6. The method of claim 5, wherein said receiver counter is randomized.

7. The method of claim 5, wherein the step of comparing said time dependent ticket further comprises the step of comparing said stored checkpoint to a current count from said receiver counter.

8. The method of claim 1, wherein said step of calculating said time dependent ticket further comprises the step of signing said time dependent ticket with a private key of said source device, and wherein said step of comparing said time dependent ticket further comprises the step of verifying the signature using a public key of said source device.

9. A copy protection system for protecting content wherein a ticket and a watermark indicates a copy protection status of said content, the system comprising:
    a source device configured to calculate a time dependent ticket using a checkpoint and a one-way function, and to provide a data stream containing said content, said ticket, a watermark, and said time dependent ticket; and
    a display device configured to produce said checkpoint, configured to receive said data stream, and configured to compare said time dependent ticket to said checkpoint using said ticket and said one-way function.

10. The system of claim 9, wherein said one-way function is a hashing function.

11. The system of claim 9, wherein said source device is further configured to calculate said time dependent ticket by combining said checkpoint with said ticket, and then calculating a one-way operation on said combined checkpoint and ticket.

12. The system of claim 9, wherein said display device is further configured to compare said ticket to said watermark and to display said content if said time dependent ticket compares to said checkpoint.

13. The system of claim 9, wherein said display device comprises a counter and wherein said checkpoint is a checkpoint from said counter.

14. The system of claim 13, wherein said display device is further configured to randomize said counter.

15. The system of claim 13, wherein said display device is further configured to compare said checkpoint to a current count from said counter prior to displaying said content.

16. The system of claim 9, wherein said source device is further configured to sign said time dependent ticket with a private key of said source device and to send said signed time dependent ticket to said display device, and wherein said display device is further configured to verify the signed time dependent ticket using a public key of said source device.

17. A source device for protecting content wherein a ticket and a watermark indicate a copy protection status of the content, said source device comprising:
    a reader device configured to read watermarked content from a physical medium and configured to read a physical mark from said physical medium; and
    a processor configured to receive a checkpoint, configured to calculate said ticket using said physical mark and a one-way function, configured to calculate a time dependent ticket using said ticket, said checkpoint, and said one-way function, and configured to provide to a receiver a data stream containing said watermarked content, said ticket, and said time dependent ticket.

18. The system of claim 17, wherein said one-way function is a hashing function.

19. A display device for receiving data from a source device, said data containing watermarked content, a time dependent ticket and a ticket, wherein said ticket and watermark together indicate a copy protection status of the content, and wherein said time dependent ticket is formed from said ticket and a checkpoint, said display device comprising:
    a counter for generating said checkpoint and a current time reference;
    means for storing said checkpoint and for providing said checkpoint to said source device prior to reception of said data; and
    a processor, wherein if said stored checkpoint is contained within a time window determined by said current time reference, said processor is configured to:
    receive said time dependent ticket and said data,
    combine said ticket with said stored checkpoint to produce a first result,
    perform a one-way function on said first result to produce a second result, and
    compare said second result to said time dependent ticket, wherein said display device is further configured to display said data if said second results compares to said time dependent ticket.

20. The system of claim 19, wherein said one-way function is a hashing function.

* * * * *